US012809529B2

(12) United States Patent
Orlando et al.

(10) Patent No.: US 12,809,529 B2
(45) Date of Patent: Nov. 24, 2026

(54) DYNAMIC ACCESS COUNTER THRESHOLD

(71) Applicant: Micron Technology, Inc., Boise, ID (US)

(72) Inventors: Alessandro Orlando, Milan (IT); Massimiliano Turconi, Gorgonzola (IT); Danilo Caraccio, Milan (IT)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 19/044,433

(22) Filed: Feb. 3, 2025

(65) Prior Publication Data

US 2025/0284407 A1 Sep. 11, 2025

Related U.S. Application Data

(60) Provisional application No. 63/561,486, filed on Mar. 5, 2024.

(51) Int. Cl.
*G06F 3/06* (2006.01)

(52) U.S. Cl.
CPC .......... *G06F 3/0619* (2013.01); *G06F 3/0629* (2013.01); *G06F 3/0673* (2013.01)

(58) Field of Classification Search
CPC ..... G06F 3/0619; G06F 3/0629; G06F 3/0673
See application file for complete search history.

(56) References Cited

U.S. PATENT DOCUMENTS 9,606,937 B1 * 3/2017 Marathe .............. G06F 12/0866
2015/0046142 A1 * 2/2015 Ramamoorthy .... G06F 12/0862 703/21
2020/0104263 A1 * 4/2020 McGlaughlin .......... G06F 12/10
2020/0333981 A1 * 10/2020 Liu ....................... G06F 3/0659
2023/0359360 A1 * 11/2023 Tang ................... H04L 67/1031

FOREIGN PATENT DOCUMENTS

EP 0359923 A2 * 3/1990 ........... G06F 9/5016

* cited by examiner

*Primary Examiner* — Jane W Benner
(74) *Attorney, Agent, or Firm* — Harrity & Harrity, LLP

(57) ABSTRACT

In some implementations, a memory device may access a first set of data stored in a first memory component. The memory device may update a first access counter associated with the first memory component based on accessing the first set of data. The memory device may determine whether the first access counter satisfies a first value of an access counter threshold. The memory device may update a value of the access counter threshold to a second value. The memory device may access a second set of data stored in a second memory component. The memory device may update a second access counter associated with the second memory component based on accessing the second set of data. The memory device may determine whether the second access counter satisfies the second value of the access counter threshold.

20 Claims, 8 Drawing Sheets

300

| 301 Time | 302 Component ID | 304 Access Counter | 306 Old Threshold Value | 308 New Threshold Value | 310 HN-L Insertion? |
|---|---|---|---|---|---|
| 1 | A | 9 | 8 | (8+1) = 9 | Yes |
| 2 | B | 8 | 9 | 9 | No |
| 3 | C | 10 | 9 | (9+1) = 10 | Yes |
| 4 | D | 12 | 10 | (10+1) = 11 | Yes |
| 5 | E | 10 | 11 | 11 | No |
| 6 | F | 20 | 11 | (11+1) = 12 | Yes |
| 7 | G | 18 | 12 | (12+1) = 13 | Yes |
| 8 | H | 15 | 13 | (13+1) = 14 | Yes |
| 9 | I | 120 | 14 | (14+1) = 15 | Yes |
| 10 | J | 8 | 15 | 15 | No |

300

| 301 Time | 302 Component ID | 304 Access Counter | 306 Old Threshold Value | 308 New Threshold Value | 310 HN-L Insertion? |
|---|---|---|---|---|---|
| 1 | A | 9 | 8 | (8+1) = 9 | Yes |
| 2 | B | 8 | 9 | 9 | No |
| 3 | C | 10 | 9 | (9+1) = 10 | Yes |
| 4 | D | 12 | 10 | (10+1) = 11 | Yes |
| 5 | E | 10 | 11 | 11 | No |
| 6 | F | 20 | 11 | (11+1) = 12 | Yes |
| 7 | G | 18 | 12 | (12+1) = 13 | Yes |
| 8 | H | 15 | 13 | (13+1) = 14 | Yes |
| 9 | I | 120 | 14 | (14+1) = 15 | Yes |
| 10 | J | 8 | 15 | 15 | No |

FIG. 3A

312

| 301 Time | 302 Component ID | 304 Access Counter | 306 Old Threshold Value | 308 New Threshold Value | 310 HN-L Insertion? |
|---|---|---|---|---|---|
| 1 | A | 9 | 8 | $\lceil Avg(8,9) \rceil = 9$ | Yes |
| 2 | B | 8 | 9 | 9 | No |
| 3 | C | 10 | 9 | $\lceil Avg(9,10) \rceil = 10$ | Yes |
| 4 | D | 12 | 10 | $\lceil Avg(10,12) \rceil = 11$ | Yes |
| 5 | E | 10 | 11 | 11 | No |
| 6 | F | 20 | 11 | $\lceil Avg(11,20) \rceil = 16$ | Yes |
| 7 | G | 18 | 16 | $\lceil Avg(16,18) \rceil = 17$ | Yes |
| 8 | H | 15 | 17 | 17 | No |
| 9 | I | 120 | 17 | $\lceil Avg(17,120) \rceil = 69$ | Yes |
| 10 | J | 8 | 69 | 69 | No |

FIG. 3B

314

| 301 Time | 302 Component ID | 304 Access Counter | 306 Old Threshold Value | 308 New Threshold Value | 310 HN-L Insertion? |
|---|---|---|---|---|---|
| 1 | A | 9 | 8 | Max(8,9) = 9 | Yes |
| 2 | B | 8 | 9 | 9 | No |
| 3 | C | 10 | 9 | Max(9,10) = 10 | Yes |
| 4 | D | 12 | 10 | Max(10,12) = 12 | Yes |
| 5 | E | 10 | 12 | 12 | No |
| 6 | F | 20 | 12 | Max(12,20) = 20 | Yes |
| 7 | G | 18 | 20 | 20 | No |
| 8 | H | 15 | 20 | 20 | No |
| 9 | I | 120 | 20 | Max(20,120) = 120 | Yes |
| 10 | J | 8 | 120 | 120 | No |

FIG. 3C

316

| 301 Time | 302 Component ID | 304 Access Counter | 306 Old Threshold Value | 308 New Threshold Value | 310 HN-L Insertion? |
|---|---|---|---|---|---|
| 1 | A | 9 | 8 | $\lceil Avg(8,9) \rceil = 9$ | Yes |
| 2 | B | 8 | 9 | $\lceil Avg(9,8) \rceil = 9$ | No |
| 3 | C | 10 | 9 | $\lceil Avg(9,10) \rceil = 10$ | Yes |
| 4 | D | 12 | 10 | $\lceil Avg(10,12) \rceil = 11$ | Yes |
| 5 | E | 10 | 11 | $\lceil Avg(11,10) \rceil = 11$ | No |
| 6 | F | 20 | 11 | $\lceil Avg(11,20) \rceil = 16$ | Yes |
| 7 | G | 18 | 16 | $\lceil Avg(16,18) \rceil = 17$ | Yes |
| 8 | H | 15 | 17 | $\lceil Avg(17,15) \rceil = 16$ | No |
| 9 | I | 120 | 16 | $\lceil Avg(16,120) \rceil = 68$ | Yes |
| 10 | J | 8 | 68 | $\lceil Avg(68,8) \rceil = 38$ | No |

FIG. 3D

318

| 301 Time | 302 Component ID | 304 Access Counter | 306 Old Threshold Value | 308 New Threshold Value | 310 HN-L Insertion? |
|---|---|---|---|---|---|
| 1 | A | 9 | 8 | $\lceil Avg(9) \rceil = 9$ | Yes |
| 2 | B | 8 | 9 | $\lceil Avg(9,8) \rceil = 9$ | No |
| 3 | C | 10 | 9 | $\lceil Avg(9,8,10) \rceil = 9$ | Yes |
| 4 | D | 12 | 9 | $\lceil Avg(9,8,10,12) \rceil = 10$ | Yes |
| 5 | E | 10 | 10 | $\lceil Avg(9,8,10,12,10) \rceil = 10$ | Yes |
| 6 | F | 20 | 10 | $\lceil Avg(8,10,12,10,20) \rceil = 12$ | Yes |
| 7 | G | 18 | 12 | $\lceil Avg(10,12,10,20,18) \rceil = 14$ | Yes |
| 8 | H | 15 | 14 | $\lceil Avg(12,10,20,18,15) \rceil = 15$ | Yes |
| 9 | I | 120 | 15 | $\lceil Avg(10,20,18,15,120) \rceil = 37$ | Yes |
| 10 | J | 8 | 37 | $\lceil Avg(20,18,15,120,8) \rceil = 37$ | No |

Moving Average Window = 5

FIG. 3E

DYNAMIC ACCESS COUNTER THRESHOLD

CROSS-REFERENCE TO RELATED APPLICATION

This Patent application claims priority to U.S. Provisional Patent Application No. 63/561,486, filed on Mar. 5, 2024, entitled "DYNAMIC ACCESS COUNTER THRESHOLD," and assigned to the assignee hereof. The disclosure of the prior Application is considered part of and is incorporated by reference into this Patent Application.

TECHNICAL FIELD

The present disclosure generally relates to memory devices, memory device operations, and, for example, to a dynamic access counter threshold.

BACKGROUND

Memory devices are widely used to store information in various electronic devices. A memory device includes memory cells. A memory cell is an electronic circuit capable of being programmed to a data state of two or more data states. For example, a memory cell may be programmed to a data state that represents a single binary value, often denoted by a binary "1" or a binary "0." As another example, a memory cell may be programmed to a data state that represents a fractional value (e.g., 0.5, 1.5, or the like). To store information, an electronic device may write to, or program, a set of memory cells. To access the stored information, the electronic device may read, or sense, the stored state from the set of memory cells.

Various types of memory devices exist, including random access memory (RAM), read only memory (ROM), dynamic RAM (DRAM), static RAM (SRAM), synchronous dynamic RAM (SDRAM), ferroelectric RAM (FeRAM), magnetic RAM (MRAM), resistive RAM (RRAM), holographic RAM (HRAM), flash memory (e.g., NAND memory and NOR memory), and others. A memory device may be volatile or non-volatile. Non-volatile memory (e.g., flash memory) can store data for extended periods of time even in the absence of an external power source. Volatile memory (e.g., DRAM) may lose stored data over time unless the volatile memory is refreshed by a power source. In some examples, a memory device may be associated with a compute express link (CXL). For example, the memory device may be a CXL compliant memory device and/or may include a CXL interface.

BRIEF DESCRIPTION OF THE DRAWINGS

FIGS. 3A-3E are diagrams of an example associated with a dynamic access counter threshold.

DETAILED DESCRIPTION

Figure 1:
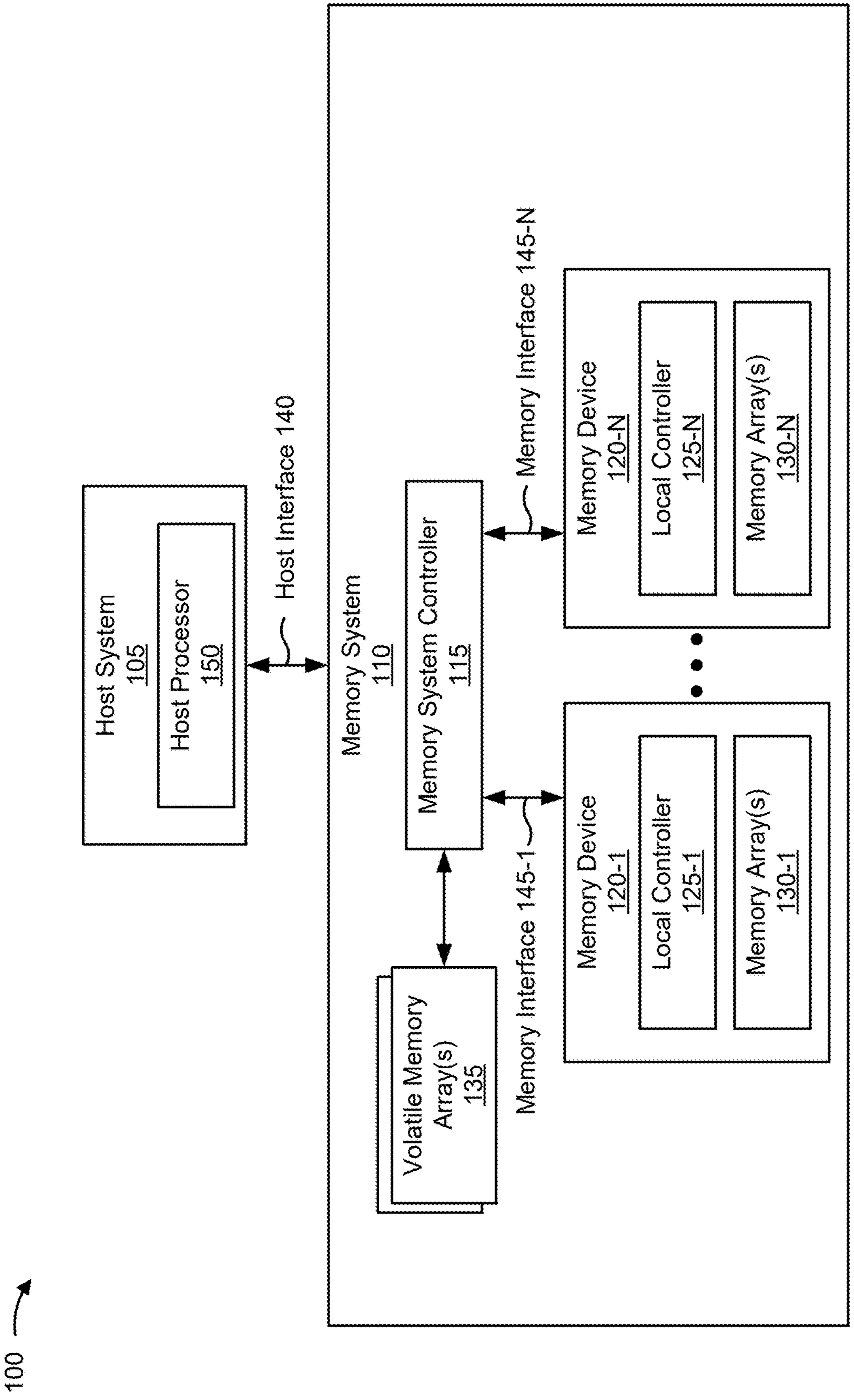
FIG. 1 is a diagram illustrating an example system that may implement a dynamic access counter threshold.

In some memory systems, a controller may track a quantity of accesses (e.g., read operations and/or write operations) to a portion of memory. For example, an access counter (sometimes referred to herein as a hotness counter (HC)), may be used by a memory system to determine if a certain portion of memory is accessed relatively frequently, sometimes referred to as being "hot," or is accessed relatively infrequently, sometimes referred to as being "cold." In such systems, the HC may be used by the memory system to make informed decisions about data management, such as by maintaining frequently accessed data (e.g., hot data) in a memory location that is easily accessible by the system in order to speed up access times, moving rarely used data (e.g., cold data) to a slower storage, and/or the like.

In some cases, relatively hot portions of memory may be identified and/or tracked using a data structure, such as a first-in-first-out (FIFO) list (sometimes referred to herein as a hotness list (HN-L)). For example, once a given portion of memory satisfies a threshold (sometimes referred to herein as an access counter threshold and/or a hotness counter threshold) during a tracking window (sometimes referred to herein as a tracking epoch), the portion of memory (more particularly, an identifier associated with the portion of memory) may be added to a FIFO list used to track hot portions of memory. In such examples, once the FIFO list is full, as more portions of memory are added to the list, other portions of memory may be removed from the list (e.g., in a FIFO manner). This may result in relatively hot portions of memory (e.g., portions of memory for which an access counter far exceeded an access counter threshold) being expelled from a list in favor of relatively cold portions of memory (e.g., portions of memory for which an access counter barely satisfies an access counter threshold). Put another way, in certain FIFO lists and similar data structures, a victim of eviction (e.g., in response to a new portion of memory being added to the list) may be a last-accessed portion of memory, with certain other parameters, such as access frequency, being ignored. This may result in frequently accessed portions of memory not being sufficiently tracked by a memory device, resulting in inefficient memory operations and thus high power, computing, and other resource consumption associated with inefficient memory operations.

Some implementations described herein enable a dynamic access counter threshold for tracking the hotness of certain portions of memory. More particularly, a memory device may be configured to update an access counter threshold associated with a FIFO data structure (e.g., a FIFO list, such as HN-L or a similar list) during a tracking epoch. For example, at each potential insertion into the FIFO data structure, a value of an access counter may be evaluated against an access counter threshold. If the value of the access counter satisfies the access counter threshold, the corresponding memory portion may be added to the FIFO data structure and/or the access counter threshold may be updated according to a certain policy. For example, in some implementations the access counter threshold may be incremented by an integer. In some other implementations, the access counter threshold may be set to a ceiling of an average between a current access counter threshold and a value of the access counter for the corresponding memory portion. In some other implementations, the access counter threshold may be set to a maximum value of the current access counter threshold and the value of the access counter for the corresponding memory portion. In some other implementations, the access counter threshold may be set to a ceiling of an average between multiple values of access counters associated with a moving average window. As a result, the dynamic access counter threshold may enable improved hotness tracking mechanisms, more efficient memory operations, and thus reduced power, computing, and other resource consumption.

FIG. 1 is a diagram illustrating an example system 100 that may implement a dynamic access counter threshold. The system 100 may include one or more devices, apparatuses, and/or components for performing operations described herein. For example, the system 100 may include a host system 105 and a memory system 110. The memory system 110 may include a memory system controller 115 and one or more memory devices 120, shown as memory devices 120-1 through 120-N (where N≥1). A memory device may include a local controller 125 and one or more memory arrays 130. The host system 105 may communicate with the memory system 110 (e.g., the memory system controller 115 of the memory system 110) via a host interface 140. The memory system controller 115 and the memory devices 120 may communicate via respective memory interfaces 145, shown as memory interfaces 145-1 through 145-N (where N≥1).

The system 100 may be any electronic device configured to store data in memory. For example, the system 100 may be a computer, a mobile phone, a wired or wireless communication device, a network device, a server, a device in a data center, a device in a cloud computing environment, a vehicle (e.g., an automobile or an airplane), and/or an Internet of Things (IoT) device. The host system 105 may include a host processor 150. The host processor 150 may include one or more processors configured to execute instructions and store data in the memory system 110. For example, the host processor 150 may include a central processing unit (CPU), a graphics processing unit (GPU), a field-programmable gate array (FPGA), an application-specific integrated circuit (ASIC), and/or another type of processing component.

The memory system 110 may be any electronic device or apparatus configured to store data in memory. For example, the memory system 110 may be a hard drive, a solid-state drive (SSD), a flash memory system (e.g., a NAND flash memory system or a NOR flash memory system), a universal serial bus (USB) drive, a memory card (e.g., a secure digital (SD) card), a secondary storage device, a non-volatile memory express (NVMe) device, an embedded multimedia card (eMMC) device, a dual in-line memory module (DIMM), and/or a random-access memory (RAM) device, such as a dynamic RAM (DRAM) device or a static RAM (SRAM) device.

The memory system controller 115 may be any device configured to control operations of the memory system 110 and/or operations of the memory devices 120. For example, the memory system controller 115 may include control logic, a memory controller, a system controller, an ASIC, an FPGA, a processor, a microcontroller, and/or one or more processing components. In some implementations, the memory system controller 115 may communicate with the host system 105 and may instruct one or more memory devices 120 regarding memory operations to be performed by those one or more memory devices 120 based on one or more instructions from the host system 105. For example, the memory system controller 115 may provide instructions to a local controller 125 regarding memory operations to be performed by the local controller 125 in connection with a corresponding memory device 120.

A memory device 120 may include a local controller 125 and one or more memory arrays 130. In some implementations, a memory device 120 includes a single memory array 130. In some implementations, each memory device 120 of the memory system 110 may be implemented in a separate semiconductor package or on a separate die that includes a respective local controller 125 and a respective memory array 130 of that memory device 120. The memory system 110 may include multiple memory devices 120.

A local controller 125 may be any device configured to control memory operations of a memory device 120 within which the local controller 125 is included (e.g., and not to control memory operations of other memory devices 120). For example, the local controller 125 may include control logic, a memory controller, a system controller, an ASIC, an FPGA, a processor, a microcontroller, a compute express link (CXL) controller connected to DRAM, and/or one or more processing components. In some implementations, the local controller 125 may communicate with the memory system controller 115 and may control operations performed on a memory array 130 coupled with the local controller 125 based on one or more instructions from the memory system controller 115. As an example, the memory system controller 115 may be an SSD controller, and the local controller 125 may be a NAND controller.

A memory array 130 may include an array of memory cells configured to store data. For example, a memory array 130 may include a non-volatile memory array (e.g., a NAND memory array or a NOR memory array) or a volatile memory array (e.g., an SRAM array or a DRAM array). In some implementations, the memory system 110 may include one or more volatile memory arrays 135. A volatile memory array 135 may include an SRAM array and/or a DRAM array, among other examples. The one or more volatile memory arrays 135 may be included in the memory system controller 115, in one or more memory devices 120, and/or in both the memory system controller 115 and one or more memory devices 120. In some implementations, the memory system 110 may include both non-volatile memory capable of maintaining stored data after the memory system 110 is powered off and volatile memory (e.g., a volatile memory array 135) that requires power to maintain stored data and that loses stored data after the memory system 110 is powered off. For example, a volatile memory array 135 may cache data read from or to be written to non-volatile memory, and/or may cache instructions to be executed by a controller of the memory system 110.

The host interface 140 enables communication between the host system 105 (e.g., the host processor 150) and the memory system 110 (e.g., the memory system controller 115). The host interface 140 may include, for example, a Small Computer System Interface (SCSI), a Serial-Attached SCSI (SAS), a Serial Advanced Technology Attachment (SATA) interface, a Peripheral Component Interconnect Express (PCIe) interface, an NVMe interface, a USB interface, a Universal Flash Storage (UFS) interface, an eMMC interface, a double data rate (DDR) interface, and/or a DIMM interface.

The memory interface 145 enables communication between the memory system 110 and the memory device 120. The memory interface 145 may include a non-volatile memory interface (e.g., for communicating with non-volatile memory), such as a NAND interface or a NOR interface. Additionally, or alternatively, the memory interface 145 may include a volatile memory interface (e.g., for communicating with volatile memory), such as a DDR interface.

In some examples, the memory system 110 may be a CXL compliant memory system (sometimes referred to herein simply as a CXL memory system) and/or one or more of the memory devices 120 may be CXL compliant memory devices (sometimes referred to herein simply as CXL memory devices). CXL is a high-speed CPU-to-device and CPU-to-memory interconnect designed to accelerate next-generation performance. CXL technology maintains memory coherency between the CPU memory space and memory on attached devices, which allows resource sharing for higher performance, reduced software stack complexity, and lower overall system cost. CXL is designed to be an industry open standard interface for high-speed communications. CXL technology is built on the PCIe infrastructure, leveraging PCIe physical and electrical interfaces to provide an advanced protocol in areas such as input/output (I/O) protocol, memory protocol, and coherency interface.

In some examples, the memory system 110 may include a PCIe/CXL interface (e.g., the host interface 140 may be associated with a PCIe/CXL interface), which may be a physical interface configured to connect the CXL memory system and/or the CXL memory device to CXL compliant host devices. In such examples, the PCIe/CXL interface may comply with CXL standard specifications for physical connectivity, ensuring broad compatibility and ease of integration into existing systems using the CXL protocol. Additionally, or alternatively, a CXL memory system and/or a CXL memory device may be designed to efficiently interface with computing systems (e.g., the host system 105) by leveraging the CXL protocol. For example, a CXL memory system and/or a CXL memory device may be configured to utilize high-speed, low-latency interconnect capabilities of CXL, such as for a purpose of making the CXL memory system and/or the CXL memory device suitable for high-performance computing, data center applications, artificial intelligence (AI) applications, and/or similar applications.

A CXL memory system and/or a CXL memory device may include a CXL memory controller (e.g., memory system controller 115 and/or local controller 125), which may be configured to manage data flow between memory arrays (e.g., volatile memory arrays 135 and/or memory arrays 130) and a CXL interface (e.g., a PCIe/CXL interface, such as host interface 140). In some examples, the CXL memory controller may be configured to handle one or more CXL protocol layers, such as an I/O layer (e.g., a layer associated with a CXL.io protocol, which may be used for purposes such as device discovery, configuration, initialization, I/O virtualization, direct memory access (DMA) using non-coherent load-store semantics, and/or similar purposes); a cache coherency layer (e.g., a layer associated with a CXL-.cache protocol, which may be used for purposes such as caching host memory using a modified, exclusive, shared, invalid (MESI) coherence protocol, or similar purposes); or a memory protocol layer (e.g., a layer associated with a CXL.memory (sometimes referred to as CXL.mem) protocol, which may enable a CXL memory device to expose host-managed device memory (HDM) to permit a host device to manage and access memory similar to a native DDR connected to the host); among other examples.

A CXL memory system and/or a CXL memory device may further include and/or be associated with one or more high-bandwidth memory modules (HBMMs) or similar memory arrays (e.g., volatile memory arrays 135 and/or memory arrays 130). For example, a CXL memory system and/or a CXL memory device may include multiple layers of DRAM (e.g., stacked and/or interconnected through advanced through-silicon via (TSV) technology) in order to maximize storage density and/or enhance data transfer speeds between memory layers. Additionally, or alternatively, a CXL memory system and/or a CXL memory device may include a power management unit, which may be configured to regulate power consumption associated with the CXL memory system and/or the CXL memory device and/or which may be configured to improve energy efficiency for the CXL memory system and/or the CXL memory device. Additionally, or alternatively, a CXL memory system and/or a CXL memory device may include additional components, such as one or more error correction code (ECC) engines, such as for a purpose of detecting and/or correcting data errors to ensure data integrity and/or improve the overall reliability of the CXL memory system and/or the CXL memory device.

Although the example memory system 110 described above includes a memory system controller 115, in some implementations, the memory system 110 does not include a memory system controller 115. For example, an external controller (e.g., included in the host system 105) and/or one or more local controllers 125 included in one or more corresponding memory devices 120 may perform the operations described herein as being performed by the memory system controller 115. Furthermore, as used herein, a "controller" may refer to the memory system controller 115, a local controller 125, or an external controller. In some implementations, a set of operations described herein as being performed by a controller may be performed by a single controller. For example, the entire set of operations may be performed by a single memory system controller 115, a single local controller 125, or a single external controller. Alternatively, a set of operations described herein as being performed by a controller may be performed by more than one controller. For example, a first subset of the operations may be performed by the memory system controller 115 and a second subset of the operations may be performed by a local controller 125. Furthermore, the term "memory apparatus" may refer to the memory system 110 or a memory device 120, depending on the context.

A controller (e.g., the memory system controller 115, a local controller 125, or an external controller) may control operations performed on memory (e.g., a memory array 130), such as by executing one or more instructions. For example, the memory system 110 and/or a memory device 120 may store one or more instructions in memory as firmware, and the controller may execute those one or more instructions. Additionally, or alternatively, the controller may receive one or more instructions from the host system 105 and/or from the memory system controller 115, and may execute those one or more instructions. In some implementations, a non-transitory computer-readable medium (e.g., volatile memory and/or non-volatile memory) may store a set of instructions (e.g., one or more instructions or code) for execution by the controller. The controller may execute the set of instructions to perform one or more operations or methods described herein. In some implementations, execution of the set of instructions, by the controller, causes the controller, the memory system 110, and/or a memory device 120 to perform one or more operations or methods described herein. In some implementations, hardwired circuitry is used instead of or in combination with the one or more instructions to perform one or more operations or methods described herein. Additionally, or alternatively, the controller may be configured to perform one or more operations or methods described herein. An instruction is sometimes called a "command."

For example, the controller (e.g., the memory system controller 115, a local controller 125, or an external controller) may transmit signals to and/or receive signals from memory (e.g., one or more memory arrays 130) based on the one or more instructions, such as to transfer data to (e.g., write or program), to transfer data from (e.g., read), to erase, and/or to refresh all or a portion of the memory (e.g., one or more memory cells, pages, sub-blocks, blocks, or planes of the memory). Additionally, or alternatively, the controller may be configured to control access to the memory and/or to provide a translation layer between the host system 105 and the memory (e.g., for mapping logical addresses to physical addresses of a memory array 130). In some implementations, the controller may translate a host interface command (e.g., a command received from the host system 105) into a memory interface command (e.g., a command for performing an operation on a memory array 130).

In some implementations, one or more systems, devices, apparatuses, components, and/or controllers of FIG. 1 may be configured to access a first set of data stored in a first memory component; update a first access counter associated with the first memory component based on accessing the first set of data; determine whether the first access counter satisfies a first value of an access counter threshold; update a value of the access counter threshold to a second value; access a second set of data stored in a second memory component; update a second access counter associated with the second memory component based on accessing the second set of data; and determine whether the second access counter satisfies the second value of the access counter threshold.

In some implementations, one or more systems, devices, apparatuses, components, and/or controllers of FIG. 1 may be configured to receive, from a host system, a first request to access a first set of host data stored in a first portion of memory; access the first set of host data stored in the first portion of memory based on receiving the first request; update a first hotness counter associated with the first portion of memory component based on accessing the first set of host data; determine whether the first hotness counter satisfies a first value of a hotness counter threshold; update a value of the hotness counter threshold to a second value; receive, from the host system, a second request to access a second set of host data stored in a second portion of memory; access the second set of host data stored in the second portion of memory based on receiving the second request; update a second hotness counter associated with the second portion of memory based on accessing the second set of host data; and determine whether the second hotness counter satisfies the second value of the hotness counter threshold.

The number and arrangement of components shown in FIG. 1 are provided as an example. In practice, there may be additional components, fewer components, different components, or differently arranged components than those shown in FIG. 1. Furthermore, two or more components shown in FIG. 1 may be implemented within a single component, or a single component shown in FIG. 1 may be implemented as multiple, distributed components. Additionally, or alternatively, a set of components (e.g., one or more components) shown in FIG. 1 may perform one or more operations described as being performed by another set of components shown in FIG. 1.

Figure 2:
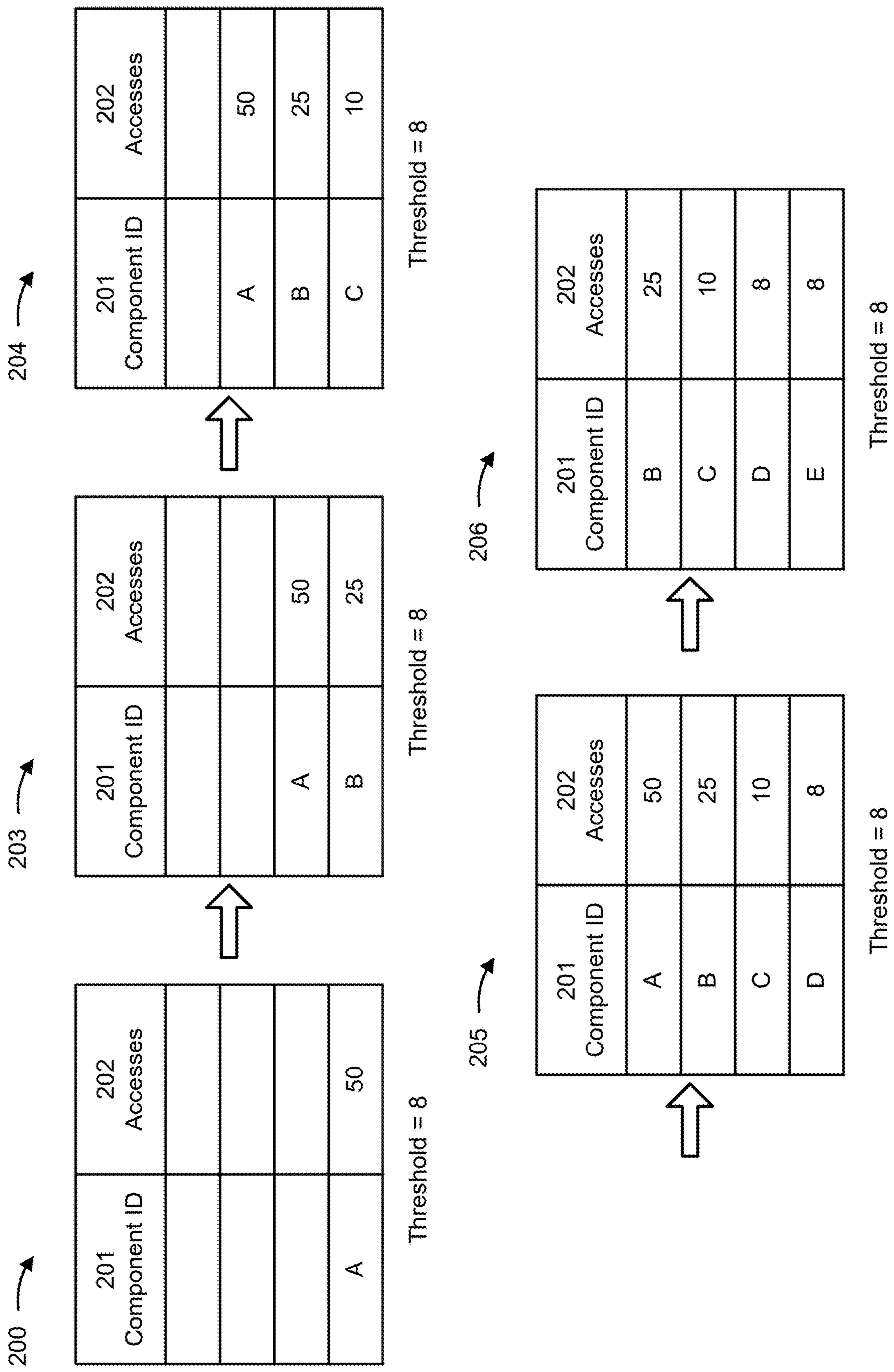
FIG. 2 is a diagram of an example associated with a static access counter threshold.

FIG. 2 is a diagram of an example associated with a static access counter threshold. The operations described in connection with FIG. 2 may be performed by the memory system 110 and/or one or more components of the memory system 110, such as the memory system controller 115, one or more memory devices 120, and/or one or more local controllers 125.

In some examples, a hotness tracking mechanism (sometimes referred to as a heatmap mechanism and/or a similar mechanism) may use a static access counter threshold (e.g., a static HC threshold) to identify hot portions of a memory system (e.g., hot components, pages, blocks, and/or other portions of a memory). For example, each of multiple memory components may be associated with an access counter (e.g., an HC), which may be incremented by a controller each time the corresponding memory component is accessed, such as each time the memory component is read from and/or written to. The memory device may be configured with a static access counter threshold, such that when a given access counter satisfies the static access counter threshold, the corresponding memory component (more particularly, an identifier (ID) associated with the corresponding memory component) may be added to a FIFO data structure, such as a FIFO hotness tracking list (e.g., HN-L) or a similar data structure.

For example, as indicated by reference number 200, a FIFO hotness tracking list may include a column including multiple component IDs, as indicated by reference number reference number 201, and a column indicating a corresponding quantity of accesses associated with each component ID, as indicated by reference number 202, among other examples. When a given access counter satisfies a static access counter threshold, the corresponding memory component ID and a value of the access counter may be added to the FIFO hotness tracking list. For example, in the example shown in FIG. 2, a static access counter threshold may be equal to 8. In such examples, when an access counter for a given memory component satisfies the static access counter threshold (e.g., 8), the memory component may be added to the FIFO hotness tracking list.

More particularly, an access counter corresponding to a first memory component associated with a first ID (shown as "A" in FIG. 2) may be equal to 50, which in this example satisfies the static access counter threshold (e.g., 8). Accordingly, as indicated by reference number 200, the first memory component may be added to the FIFO hotness tracking list, such as by including the first ID (e.g., A) in the component ID column and/or by indicating the value of the corresponding access counter (e.g., 50) in the quantity of accesses column. Similarly, an access counter corresponding to a second memory component associated with a second ID (shown as "B" in FIG. 2) may be equal to 25, and thus may satisfy the static access counter threshold. Accordingly, as indicated by reference number 203, the second memory component may be added to the FIFO hotness tracking list. Moreover, an access counter corresponding to a third memory component associated with a third ID (shown as "C" in FIG. 2) may be equal to 10, and thus may satisfy the static access counter threshold. Accordingly, as indicated by reference number 204, the third memory component may be added to the FIFO hotness tracking list. Furthermore, an access counter corresponding to a fourth memory component associated with a fourth ID (shown as "D" in FIG. 2) may be equal to 8, and thus may satisfy the static access counter threshold. Accordingly, as indicated by reference number 205, the fourth memory component may be added to the FIFO hotness tracking list.

At this point, the FIFO hotness counter tracking list may be full, and thus any additional entries to the list may evict another entry from the list, in a FIFO manner. For example, an access counter corresponding to a fifth memory component associated with a fifth ID (shown as "E" in FIG. 2 for ease of description) may be equal to 8, and thus may satisfy the static access counter threshold. Accordingly, as indicated by reference number 206, the fifth memory component may be added to the FIFO hotness tracking list, and the first memory component (e.g., the memory component associated with ID A) may be evicted from the FIFO hotness tracking list, because out of the memory components included in the FIFO hotness tracking list, the first memory component was the first-in-time to be added to the list. In this regard, the eviction may be performed agnostic to other parameters, such as a corresponding number of accesses associated with the memory components included in the FIFO hotness tracking list. This may result in inefficient memory operations, because relatively hot memory components may be evicted from the list in favor of relatively cold memory components. More particularly, returning to the example shown in FIG. 2, due to the FIFO nature of the list, the hottest memory component (e.g., the memory component associated with ID A, which is associated with 50 accesses) is evicted in favor of a memory component that is associated with only 8 accesses. This may lead to inefficient memory operations and thus high power, computing, and other resource consumption.

As indicated above, FIG. 2 is provided as an example. Other examples may differ from what is described with regard to FIG. 2.

FIGS. 3A-3E are diagrams of an example associated with a dynamic access counter threshold. The operations described in connection with FIGS. 3A-3E may be performed by the memory system 110 and/or one or more components of the memory system 110, such as the memory system controller 115, one or more memory devices 120, and/or one or more local controllers 125.

In some implementations, a memory device may utilize a dynamic access counter threshold instead of, or in addition to, the static access counter threshold described above in connection with FIG. 2, thus resulting in more efficient memory operations and thus reduced power, computing, and other resource consumption. For example, at each potential insertion of a memory component into a FIFO hotness tracking list (e.g., HN-L) or similar data structure, an access counter value corresponding to the memory component may be evaluated against a current value of the dynamic access counter threshold. If the access counter value satisfies the current value of the dynamic access counter threshold, the corresponding memory component may be added to the FIFO hotness tracking list and/or the dynamic access counter threshold may be updated following a configured policy methodology, such as by increasing the value of the dynamic access counter threshold by one, setting the value of the dynamic access counter threshold to a ceiling of an average between a current value of the access counter threshold and the access counter value being added to the list, setting the value of the dynamic access counter threshold to a maximum of the current value of the access counter threshold and the access counter value being added to the list, or setting the value of the dynamic access counter threshold to a ceiling of an average of multiple hotness access values included in a moving average window, among other examples.

In some implementations, an initial value of the dynamic access counter threshold may be set as a configuration parameter (e.g., using one or more mode registers associated with a memory, among other examples), and/or a host system (e.g., host system 105) may have a capability of switching between a static access counter threshold and a dynamic access counter threshold at the end of each tracking epoch, such as by using one or more configuration parameters set via a mode register, or the like. In some implementations, at a start of each tracking epoch, the dynamic access counter threshold may be reset, reconfigured, or otherwise changed. For example, at a start of each tracking epoch, the dynamic access counter threshold may be set to a default value (e.g., an initially configured value of the dynamic access counter threshold), may be reduced according to a configurable reduction factor (e.g., the value of the dynamic access counter threshold may be halved, quartered, or the like), or the dynamic access counter threshold may be left at a current value (e.g., the dynamic access counter threshold may not be reduced and/or reset), among other examples. In this way, a FIFO data structure (e.g., a FIFO hotness tracking list, such as HN-L or the like) may include the most frequently accessed hot pages, rather than blindly evicting hot pages in favor of cold pages. Additionally, or alternatively, a quantity of eviction events associated with a FIFO data structure may be reduced, thereby reducing the complexity of a hotness tracking mechanism associated with a memory. Moreover, the dynamic access counter tracking threshold may be employed using existing systems and/or architectures, making an impact on memory system architecture minimal.

In some implementations, the dynamic access counter threshold and/or a tracking mechanism utilizing the dynamic access counter threshold may be configurable, such as by user-configured parameters received via one or more mode registers, or the like. For example, the one or more user-configured parameters associated with the dynamic access counter threshold and/or a tracking mechanism utilizing the dynamic access counter threshold may include a parameter enabling the dynamic access counter threshold and/or a parameter enabling a mechanism utilizing the dynamic access counter threshold, a parameter setting a beginning value of the dynamic access counter threshold, a parameter indicating a policy for updating the dynamic access counter threshold (e.g., one of the policies described in more detail below in connection with FIGS. 3A-3E), and/or a parameter indicating a policy for reducing and/or resetting the dynamic access counter threshold (e.g., a policy for reducing and/or resetting the dynamic access counter threshold at a start of each tracking epoch). In this way, at the start of each tracking epoch, a value of the dynamic access counter threshold may be set to a beginning value (e.g., a value indicated by the user-configurable parameters). Moreover, for each tracked access to the memory, an access counter may be compared to the dynamic access counter threshold and/or the dynamic access counter threshold may be updated according to some policy (e.g., one of the policies described in more detail below in connection with FIGS. 3A-3E and/or a policy indicated by the user-configurable parameters). And at the end of each tracking epoch, the dynamic access counter threshold may be reset, reduced, and/or maintained according to a reset policy (e.g., a policy for reducing and/or resetting the dynamic access counter threshold at the start of each tracking epoch, which may be set by a user-configurable parameter).

FIG. 3A shows a table depicting a first example policy 300 that may be used to update a dynamic access counter threshold during a period of time in which accesses to portions of memory are being tracked (e.g., during a tracking epoch), according to some implementations. In some implementations, the first example policy 300 may be referred to as a soft policy methodology. As shown in FIG. 3A, at different times (e.g., the times indexed as 1-10 in the time column indicated by reference number 301), access counters (e.g., hotness counters) associated with various portions of memory may be compared to a dynamic access counter threshold (e.g., a threshold for which a value may change during the tracking epoch) for a purpose of determining whether the portions of memory should be included in a FIFO data structure (e.g., HN-L) that tracks hot portions of memory. More particularly, as indicated by reference number 302, values of access counters associated with memory components indexed A-J may be compared to a dynamic access counter threshold. As indicated by reference number 304, which shows a value of an access counter corresponding to each memory component, each memory component satisfies the static access counter threshold (e.g., 8) described above in connection with FIG. 2. Accordingly, if the static access counter threshold is to be employed for adding the memory components indexed A-J to the FIFO data structure, each memory component would be added to the data structure, which may cause certain relatively hot memory components to be evicted from the memory structure, as described above in connection with FIG. 2.

In this implementation, however, a value of the access counter threshold may be updated during the tracking epoch, such as by adding an integer (e.g., 1 in the example depicted in FIG. 2, but which may be a different integer in other implementations) each time a memory component is added to the data structure (e.g., HN-L). More particularly, the column indicated by reference number 306 shows a value of the access counter threshold when a memory device is making a determination as to whether to add a corresponding memory component to the data structure (sometimes referred to herein as an old threshold value), and the column indicated by reference number 308 shows a value of the access counter threshold after the memory device has made the determination as to whether to add the corresponding memory component to the data structure, with the determination as to whether to add the corresponding memory component to the data structure being shown in the column indicated by reference number 310.

In some implementations, when a certain memory component is added to the data structure, an integer (e.g., 1 in the example shown in FIG. 3A) is added to the old threshold value to arrive at the new threshold value. More particularly, in example 300 shown in FIG. 3A, an access counter threshold may be initially configured as 8, in a similar manner as described above in connection with FIG. 2. Accordingly, when a value of an access counter associated with a first memory component satisfies the initially configured access counter threshold, the memory component may be added to the data structure (e.g., HN-L) and a value of the dynamic access counter threshold may be incremented by 1. More particularly, at Time 1, memory component A may have an access counter value of 9, which satisfies the initially configured access counter threshold value of 8. Accordingly, memory component A may be added to the FIFO data structure used to track hot memory portions (e.g., shown as “Yes” in the column indicated by reference number 310), and the access counter threshold may be updated to 9 (e.g., 8+1=9). This new access counter threshold may thereafter be used to evaluate whether other memory components should subsequently be added to the FIFO data structure.

In that regard, at Time 2, memory component B may have an access counter value of 8, which would have satisfied the initially configured access counter threshold value and/or a static access counter threshold value of 8. However, memory component B does not satisfy the updated access counter threshold (e.g., 9), and thus memory component B may not be added to the FIFO data structure (e.g., shown as “No” in the column indicated by reference number 310). Accordingly, the access counter threshold may remain at 9 in this example, as shown in the column indicated by reference number 308.

The memory device may continue in a similar manner for the remainder of the tracking epoch. For example, at Time 3, memory component C may have an access counter value of 10, which satisfies the current access counter threshold value of 9, and thus memory component C may be added to the FIFO data structure and the access counter threshold may be updated to 10 (e.g., 9+1=10). At Time 4, memory component D may have an access counter value of 12, which satisfies the current access counter threshold value of 10, and thus memory component D may be added to the FIFO data structure and the access counter threshold may be updated to 11 (e.g., 10+1=11). At Time 5, memory component E may have an access counter value of 10, which does not satisfy the current access counter threshold value of 11, and thus the memory device may refrain from adding memory component E to the FIFO data structure (even though memory component E would have been added to the FIFO data structure using a static access counter threshold) and the access counter threshold may remain at 11. At Time 6, memory component F may have an access counter value of 20, which satisfies the current access counter threshold value of 11, and thus memory component F may be added to the FIFO data structure and the access counter threshold may be updated to 12 (e.g., 11+1=12). At Time 7, memory component G may have an access counter value of 18, which satisfies the current access counter threshold value of 12, and thus memory component G may be added to the FIFO data structure and the access counter threshold may be updated to 13 (e.g., 12+1=13). At Time 8, memory component H may have an access counter value of 15, which satisfies the current access counter threshold value of 13, and thus memory component H may be added to the FIFO data structure and the access counter threshold may be updated to 14 (e.g., 13+1=14). At Time 9, memory component I may have an access counter value of 120, which satisfies the current access counter threshold value of 14, and thus memory component I may be added to the FIFO data structure and the access counter threshold may be updated to 15 (e.g., 14+1=15). And at Time 10, memory component J may have an access counter value of 8, which does not satisfy the current access counter threshold value of 15, and thus the memory device may refrain from adding memory component J to the FIFO data structure (even though memory component J would have been added to the FIFO data structure using a static access counter threshold) and the access counter threshold may remain at 15.

In this way, fewer memory components may be evicted from the FIFO data structure than would have been if a static access counter threshold had been used for making determinations as to whether the memory components A-J were to be added to the FIFO data structure (e.g., HN-L). For example, assuming that the FIFO data structure was full at the beginning of the tracking epoch, and thus every added memory component required eviction of another memory component from the FIFO data structure, using a static access counter threshold (e.g., 8) would have resulted in 10 evictions, because each of the ten memory components shown in FIG. 3A (e.g., memory components A-J) satisfy the static access counter threshold. However, by utilizing the dynamic access counter threshold, only 7 evictions would be needed (because memory components B, E, and J are not added to the FIFO data structure). This may result in a FIFO data structure that more accurately reflects hot memory components and thus enables more efficient memory operations.

FIG. 3B shows a table depicting a second example policy 312 that may be used to update a dynamic access counter threshold during a period of time in which accesses to portions of memory are being tracked (e.g., during a tracking epoch), according to some other implementations. In such implementations, the second example policy 312 may result in fewer memory components being added to the FIFO data structure than the first example policy 300, and thus the second example policy 312 may be referred to as a mid policy methodology.

In the implementation shown in FIG. 3B, when a memory component is added to the FIFO data structure, a value of the access counter threshold may be set to a ceiling of an average of the current value of the access counter threshold (e.g., a value of the access counter threshold when the memory device is making a determination as to whether to add a corresponding memory component to the data structure) and a value of the access counter for the corresponding memory component. More particularly, at Time 1, memory component A may have an access counter value of 9, which satisfies the initially configured access counter threshold value of 8. Accordingly, memory component A may be added to the FIFO data structure used to track hot memory portions (e.g., HN-L), and the access counter threshold may be updated to a ceiling of an average between the old threshold value (e.g., 8) and the access counter value for memory component A (e.g., 9), which is equal to 9 (e.g., ⌈Avg(8,9)⌉=⌈8.5⌉=9). This new access counter threshold may thereafter be used to evaluate whether other memory components should subsequently be added to the FIFO data structure.

In that regard, at Time 2, memory component B may have an access counter value of 8, which would have satisfied the initially configured access counter threshold value and/or a static access counter threshold value of 8. However, memory component B does not satisfy the updated access counter threshold (e.g., 9), and thus memory component B may not be added to the FIFO data structure. Accordingly, the access counter threshold may remain at 9 in this example, as shown in the column indicated by reference number 308.

The memory device may continue in a like manner for the remainder of the tracking epoch. For example, at Time 3, memory component C may have an access counter value of 10, which satisfies the current access counter threshold value of 9, and thus memory component C may be added to the FIFO data structure and the access counter threshold may be updated to 10 (e.g., ⌈Avg(9,10)⌉=⌈9.5⌉=10). At Time 4, memory component D may have an access counter value of 12, which satisfies the current access counter threshold value of 10, and thus memory component D may be added to the FIFO data structure and the access counter threshold may be updated to 11 (e.g., ⌈Avg(10,12)⌉=⌈11⌉=11). At Time 5, memory component E may have an access counter value of 10, which does not satisfy the current access counter threshold value of 11, and thus the memory device may refrain from adding memory component E to the FIFO data structure (even though memory component E would have been added to the FIFO data structure using a static access counter threshold) and the access counter threshold may remain at 11. At Time 6, memory component F may have an access counter value of 20, which satisfies the current access counter threshold value of 11, and thus memory component F may be added to the FIFO data structure and the access counter threshold may be updated to 16 (e.g., ⌈Avg(11,20)⌉=⌈15.5⌉=16). At Time 7, memory component G may have an access counter value of 18, which satisfies the current access counter threshold value of 16, and thus memory component G may be added to the FIFO data structure and the access counter threshold may be updated to 17 (e.g., ⌈Avg(16,18)⌉==17). At Time 8, memory component H may have an access counter value of 15, which does not satisfy the current access counter threshold value of 17, and thus the memory device may refrain from adding memory component H to the FIFO data structure (even though memory component H would have been added to the FIFO data structure using a static access counter threshold and/or using the soft policy methodology described above in connection with FIG. 3A) and the access counter threshold may remain at 17. At Time 9, memory component I may have an access counter value of 120, which satisfies the current access counter threshold value of 17, and thus memory component I may be added to the FIFO data structure and the access counter threshold may be updated to 69 (e.g., ⌈Avg(17,120)⌉=⌈68.5⌉=69). And at Time 10, memory component J may have an access counter value of 8, which does not satisfy the current access counter threshold value of 69, and thus the memory device may refrain from adding memory component J to the FIFO data structure (even though memory component J would have been added to the FIFO data structure using a static access counter threshold) and the access counter threshold may remain at 69.

In this way, fewer memory components may be evicted from the FIFO data structure than would have been if a static access counter threshold had been used for making determinations as to whether the memory components A-J were to be added to the FIFO data structure (e.g., HN-L) and/or if the soft policy methodology had been used for making determinations as to whether the memory components A-J were to be added to the FIFO data structure. For example, as described above in connection with FIG. 3A, using a static access counter threshold (e.g., 8) would have resulted in 10 evictions, and using the soft policy methodology would have resulted in 7 evictions. However, by utilizing the mid policy methodology, only 6 evictions may be needed (because memory components B, E, H, and J are not added to the FIFO data structure). This may result in a FIFO data structure that more accurately reflects hot memory components and thus enables more efficient memory operations.

FIG. 3C shows a table depicting a third example policy 314 that may be used to update a dynamic access counter threshold during a period of time in which accesses to portions of memory are being tracked (e.g., during a tracking epoch), according to some other implementations. In some implementations, the third example policy 314 may result in fewer memory components being added to the FIFO data structure than the first example policy 300 and/or the second example policy 312, and thus the third example policy 314 may be referred to as an aggressive policy methodology.

In the implementation shown in FIG. 3C, when a memory component is added to the FIFO data structure, a value of the access counter threshold may be updated to a maximum of the current value of the access counter threshold (e.g., a value of the access counter threshold when the memory device is making a determination as to whether to add a corresponding memory component to the data structure) and a value of the access counter for the corresponding memory component. More particularly, at Time 1, memory component A may have an access counter value of 9, which satisfies the initially configured access counter threshold value of 8. Accordingly, memory component A may be added to the FIFO data structure used to track hot memory portions (e.g., HN-L), and the access counter threshold may be updated to a maximum of the old threshold value (e.g., 8) and the access counter value for memory component A (e.g., 9), which is equal to 9 (e.g., Max (8,9)=9). This new access counter threshold may thereafter be used to evaluate whether other memory components should subsequently be added to the FIFO data structure.

In that regard, at Time 2, memory component B may have an access counter value of 8, which would have satisfied the initially configured access counter threshold value and/or a static access counter threshold value of 8. However, memory component B does not satisfy the updated access counter threshold (e.g., 9), and thus memory component B may not be added to the FIFO data structure. Accordingly, the access counter threshold may remain at 9 in this example, as shown in the column indicated by reference number 308.

The memory device may continue in a like manner for the remainder of the tracking epoch. For example, at Time 3, memory component C may have an access counter value of 10, which satisfies the current access counter threshold value of 9, and thus memory component C may be added to the FIFO data structure and the access counter threshold may be updated to 10 (e.g., Max (9,10)=10). At Time 4, memory component D may have an access counter value of 12, which satisfies the current access counter threshold value of 10, and thus memory component D may be added to the FIFO data structure and the access counter threshold may be updated to 12 (e.g., Max (10,12)=12). At Time 5, memory component E may have an access counter value of 10, which does not satisfy the current access counter threshold value of 12, and thus the memory device may refrain from adding memory component E to the FIFO data structure (even though memory component E would have been added to the FIFO data structure using a static access counter threshold) and the access counter threshold may remain at 12. At Time 6, memory component F may have an access counter value of 20, which satisfies the current access counter threshold value of 12, and thus memory component F may be added to the FIFO data structure and the access counter threshold may be updated to 20 (e.g., Max (12,20)=20). At Time 7, memory component G may have an access counter value of 18, which does not satisfy the current access counter threshold value of 20, and thus the memory device may refrain from adding memory component G to the FIFO data structure (even though memory component G would have been added to the FIFO data structure using a static access counter threshold, using the soft policy methodology described above in connection with FIG. 3A, and/or using the mid policy methodology described above in connection with FIG. 3B) and the access counter threshold may remain at 20. At Time 8, memory component H may have an access counter value of 15, which does not satisfy the current access counter threshold value of 20, and thus the memory device may refrain from adding memory component H to the FIFO data structure (even though memory component H would have been added to the FIFO data structure using a static access counter threshold and/or using the soft policy methodology described above in connection with FIG. 3A) and the access counter threshold may remain at 20. At Time 9, memory component I may have an access counter value of 120, which satisfies the current access counter threshold value of 20, and thus memory component I may be added to the FIFO data structure and the access counter threshold may be updated to 120 (e.g., Max (20,120)=120). And at Time 10, memory component J may have an access counter value of 8, which does not satisfy the current access counter threshold value of 120, and thus the memory device may refrain from adding memory component J to the FIFO data structure (even though memory component J would have been added to the FIFO data structure using a static access counter threshold) and the access counter threshold may remain at 120.

In this way, fewer memory components may be evicted from the FIFO data structure than would have been if a static access counter threshold had been used for making determinations as to whether the memory components A-J were to be added to the FIFO data structure (e.g., HN-L), if the soft policy methodology had been used for making determinations as to whether the memory components A-J were to be added to the FIFO data structure, and/or if the mid policy methodology had been used for making determinations as to whether the memory components A-J were to be added to the FIFO data structure. For example, as described above in connection with FIG. 3B, using a static access counter threshold (e.g., 8) would have resulted in 10 evictions, using the soft policy methodology would have resulted in 7 evictions, and using the mid policy methodology would have resulted in 6 evictions. However, by utilizing the dynamic access counter threshold, only 5 evictions may be needed (because memory components B, E, G, H, and J are not added to the FIFO data structure). This may result in a FIFO data structure that more accurately reflects hot memory components and thus enables more efficient memory operations.

FIG. 3D shows a table depicting a fourth example policy 316 that may be used to update a dynamic access counter threshold during a period of time in which accesses to portions of memory are being tracked (e.g., during a tracking epoch), according to some other implementations. In some implementations, the fourth example policy 316 may be referred to as an average policy methodology.

In the implementation shown in FIG. 3D, a value of the access counter threshold may be set to a ceiling of an average of a current value of the access counter threshold (e.g., a value of the access counter threshold when the memory device is making a determination as to whether to add a corresponding memory component to the data structure) and a value of the access counter for the corresponding memory component, regardless of whether the corresponding memory component is ultimately added to the FIFO data structure (e.g., HN-L). In this regard, the access counter threshold may dynamically fluctuate up and down, because relatively small access counter values may be used at certain portions of the tracking epoch to calculate a new access counter threshold value.

More particularly, at Time 1, memory component A may have an access counter value of 9, which satisfies the initially configured access counter threshold value of 8. Accordingly, memory component A may be added to the FIFO data structure used to track hot memory portions (e.g., HN-L), and the access counter threshold may be updated to a ceiling of an average between the old threshold value (e.g., 8) and the access counter value for memory component A (e.g., 9), which is equal to 9 (e.g., $\lceil Avg(8,9)\rceil=\lceil 8.5\rceil=9$). This new access counter threshold may thereafter be used to evaluate whether other memory components should subsequently be added to the FIFO data structure.

In that regard, at Time 2, memory component B may have an access counter value of 8, which would have satisfied the initially configured access counter threshold value and/or a static access counter threshold value of 8. However, memory component B does not satisfy the updated access counter threshold (e.g., 9), and thus memory component B may not be added to the FIFO data structure. However, in this implementation the access counter threshold may nonetheless be updated to a ceiling of an average of the old threshold value (e.g., 9) and a value of the access counter for memory component B (e.g., 8), notwithstanding that memory component B was not added to the FIFO data structure. Accordingly, the value of the access counter value may be updated to 9 (e.g., ⌈Avg(9,8)⌉=⌈8.5⌉=9).

The memory device may continue in a like manner for the remainder of the tracking epoch. For example, at Time 3, memory component C may have an access counter value of 10, which satisfies the current access counter threshold value of 9, and thus memory component C may be added to the FIFO data structure and the access counter threshold may be updated to 10 (e.g., ⌈Avg(9,10)⌉=⌈9.5⌉=10). At Time 4, memory component D may have an access counter value of 12, which satisfies the current access counter threshold value of 10, and thus memory component D may be added to the FIFO data structure and the access counter threshold may be updated to 11 (e.g., ⌈Avg(10,12)⌉=⌈11⌉=11). At Time 5, memory component E may have an access counter value of 10, which does not satisfy the current access counter threshold value of 11, and thus the memory device may refrain from adding memory component E to the FIFO data structure, but the access counter threshold may nonetheless be updated to 11 (e.g., ⌈Avg(11,10)⌉=⌈10.5⌉=11). At Time 6, memory component F may have an access counter value of 20, which satisfies the current access counter threshold value of 11, and thus memory component F may be added to the FIFO data structure and the access counter threshold may be updated to 16 (e.g., ⌈Avg(11,20)⌉=⌈15.5⌉=16). At Time 7, memory component G may have an access counter value of 18, which satisfies the current access counter threshold value of 16, and thus memory component G may be added to the FIFO data structure and the access counter threshold may be updated to 17 (e.g., ⌈Avg(16,18)⌉=⌈17⌉=17). At Time 8, memory component H may have an access counter value of 15, which does not satisfy the current access counter threshold value of 17, and thus the memory device may refrain from adding memory component H to the FIFO data structure, but the access counter threshold may nonetheless be updated to 16 (e.g., ⌈Avg(17,15)⌉=⌈16⌉=16). In this regard, unlike the policies described above in connection with FIGS. 3A-3C, a value of the access counter threshold may, in some cases, decrease during the tracking epoch. At Time 9, memory component I may have an access counter value of 120, which satisfies the current access counter threshold value of 16, and thus memory component I may be added to the FIFO data structure and the access counter threshold may be updated to 68 (e.g., ⌈Avg(16,120)⌉==68). And at Time 10, memory component J may have an access counter value of 8, which does not satisfy the current access counter threshold value of 69, and thus the memory device may refrain from adding memory component J to the FIFO data structure, but the access counter threshold may nonetheless be updated to 38 (e.g., ⌈Avg(68,8)⌉==38).

In this way, fewer memory components may be evicted from the FIFO data structure than would have been if a static access counter threshold had been used for making determinations as to whether the memory components A-J were to be added to the FIFO data structure. For example, as described above in connection with FIG. 3A, using a static access counter threshold (e.g., 8) would have resulted in 10 evictions. However, by utilizing the dynamic access counter threshold updated using the average policy methodology, only 6 evictions were made (because memory components B, E, H, and J are not added to the FIFO data structure). This may result in a FIFO data structure that more accurately reflects hot memory components and thus enables more efficient memory operations.

FIG. 3E shows a table depicting a fifth example policy 318 that may be used to update a dynamic access counter threshold (e.g., a dynamic hotness counter threshold) during a period of time in which accesses to portions of memory are being tracked (e.g., during a tracking epoch), according to some other implementations. In some implementations, the fifth example policy 318 may be referred to as a moving average policy methodology.

In the implementation shown in FIG. 3E, a value of the access counter threshold may be set to a ceiling of an average of multiple access counters for multiple memory components. In this regard, similar to the fourth example policy 316 described above in connection with FIG. 3D, the access counter threshold may dynamically fluctuate up and down. In some implementations, a quantity of the multiple access counters used to determine a moving average may be associated with a moving average window. For example, the moving average window may be a maximum quantity of access counter values that are to be used to calculate a current access counter threshold value. In the implementation shown in FIG. 3E, the moving average window may be 5 (e.g., up to five access counter values may be used to perform an average calculation used to set the dynamic access counter threshold), but, in some other implementations, the moving average window may be more or less than 5 without departing from the scope of the disclosure.

More particularly, at Time 1, memory component A may have an access counter value of 9, which satisfies the initially configured access counter threshold value of 8. Accordingly, memory component A may be added to the FIFO data structure used to track hot memory portions (e.g., HN-L), and the access counter threshold may be updated to a ceiling of an average of access counter values for up to five previously tracked memory components for the current tracking epoch. Because, in this implementation, memory component A is the first memory component tracked for the tracking epoch, the access counter threshold may be updated to a ceiling of an average of the access counter value for the memory component A (e.g., ⌈Avg(9)⌉=⌈9⌉=9). This new access counter threshold may thereafter be used to evaluate whether other memory components should subsequently be added to the FIFO data structure. In that regard, at Time 2, memory component B may have an access counter value of 8, which does not satisfy the dynamic access counter threshold value of 9. Accordingly, memory component B may not be added to the FIFO data structure. Moreover, the access counter threshold may be updated to a ceiling of an average of the access counter values for up to five previously tracked memory components for the given tracking epoch (which, at Time 2, includes memory component A and memory component B). Accordingly, the value of the access counter value may be updated to 9 (e.g., ⌈Avg(9,8)⌉=⌈8.5⌉=9).

The memory device may continue in a like manner for the remainder of the tracking epoch. For example, at Time 3, memory component C may have an access counter value of 10, which satisfies the current access counter threshold value of 9, and thus memory component C may be added to the FIFO data structure and the access counter threshold may be updated to 9 (e.g., ⌈Avg(9,8,10)⌉=⌈9⌉=9). At Time 4, memory component D may have an access counter value of 12, which satisfies the current access counter threshold value of 9, and thus memory component D may be added to the FIFO data structure and the access counter threshold may be updated to 10 (e.g., ⌈Avg(9,8,10,12)⌉=⌈9.75⌉=10). At Time 5, memory component E may have an access counter value of 10, which satisfies the current access counter threshold value of 10, and thus memory component E may be added to the FIFO data structure and the access counter threshold may be updated to 10 (e.g., ⌈Avg(9,8,10,12,10)⌉=⌈9.8⌉=10). At Time 6, memory component F may have an access counter value of 20, which satisfies the current access counter threshold value of 10, and thus memory component F may be added to the FIFO data structure and the access counter threshold may be updated to 12 (e.g., ⌈Avg(8,10, 12,10,20)⌉=⌈12⌉=12). At Time 7, memory component G may have an access counter value of 18, which satisfies the current access counter threshold value of 12, and thus memory component G may be added to the FIFO data structure and the access counter threshold may be updated to 14 (e.g., ⌈Avg(10,12,10,20,18)⌉=⌈14⌉=14). At Time 8, memory component H may have an access counter value of 15, which satisfies the current access counter threshold value of 14, and thus memory component G may be added to the FIFO data structure and the access counter threshold may be updated to 15 (e.g., ⌈Avg(12,10,20,18,15)⌉=⌈15⌉=15). At Time 9, memory component I may have an access counter value of 120, which satisfies the current access counter threshold value of 15, and thus memory component I may be added to the FIFO data structure and the access counter threshold may be updated to 37 (e.g., ⌈Avg(10,20,18,15,120)⌉=⌈36.6⌉=37). And at Time 10, memory component J may have an access counter value of 8, which does not satisfy the current access counter threshold value of 37, and thus the memory device may refrain from adding memory component J to the FIFO data structure, but the access counter threshold may nonetheless be updated to 37 (e.g., ⌈Avg(20, 18,15,120,8)⌉=⌈36.2⌉=37).

In this way, fewer memory components may be evicted from the FIFO data structure than would have been if a static access counter threshold had been used for making determinations as to whether the memory components A-J were to be added to the FIFO data structure. For example, as described above in connection with FIG. 3A, using a static access counter threshold (e.g., 8) would have resulted in 10 evictions. However, by utilizing the dynamic access counter threshold updated using the moving average policy methodology, only 8 evictions may be needed (because memory components B and J are not added to the FIFO data structure). This may result in a FIFO data structure that more accurately reflects hot memory components and thus enables more efficient memory operations, as described above.

As indicated above, FIGS. 3A-3E are provided as an example. Other examples may differ from what is described with regard to FIGS. 3A-3E.

Figure 4:
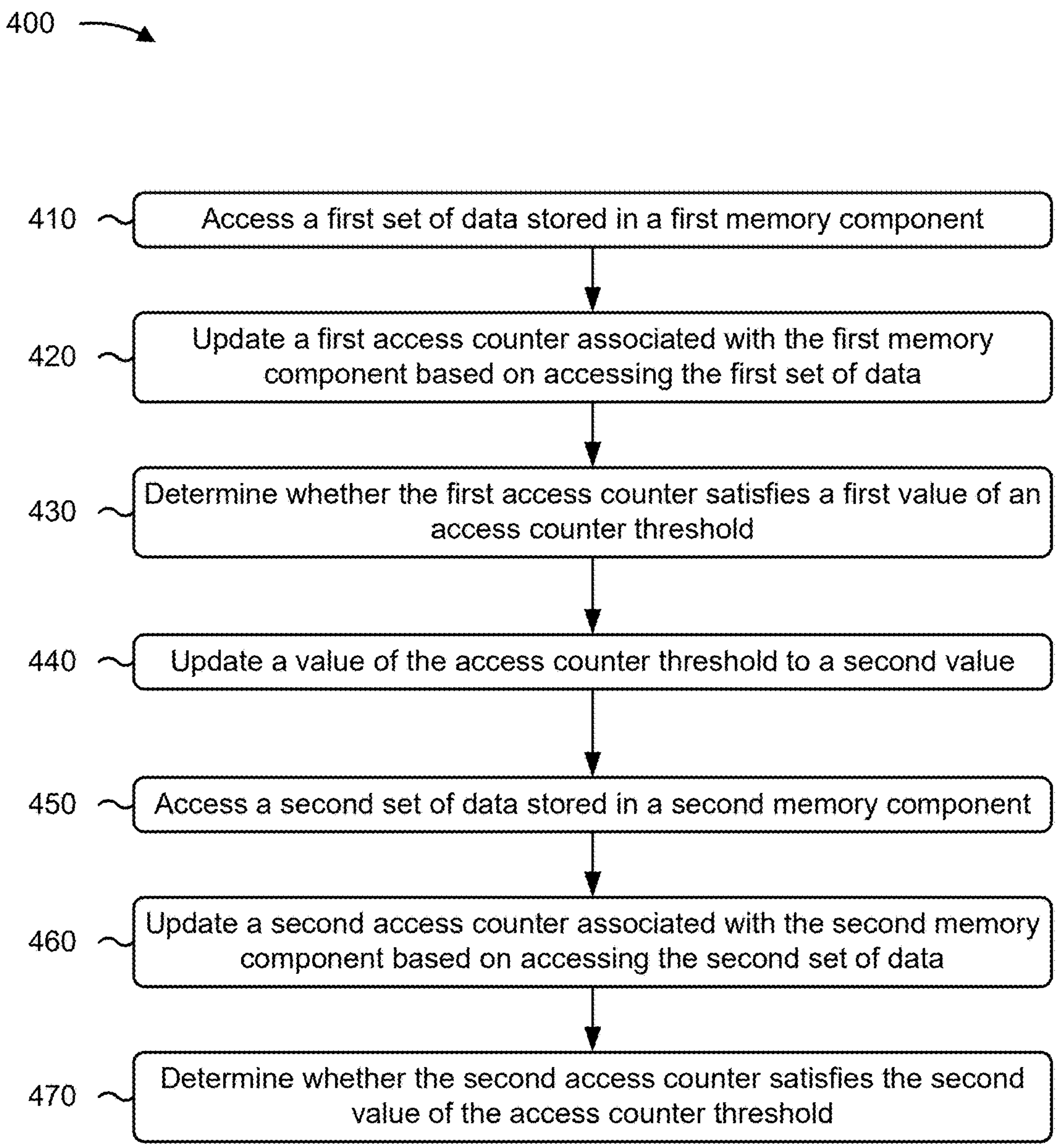
FIG. 4 is a flowchart of an example method associated with implementing a dynamic access counter threshold.

FIG. 4 is a flowchart of an example method 400 associated with implementing a dynamic access counter threshold. In some implementations, a memory device (e.g., the memory device 120) may perform or may be configured to perform the method 400. In some implementations, another device or a group of devices separate from or including the memory device (e.g., the system 100) may perform or may be configured to perform the method 400. Additionally, or alternatively, one or more components of the memory device (e.g., the memory system controller 115, the local controller 125, and/or the memory array 130) may perform or may be configured to perform the method 400. Thus, means for performing the method 400 may include the memory device and/or one or more components of the memory device. Additionally, or alternatively, a non-transitory computer-readable medium may store one or more instructions that, when executed by the memory device (e.g., the local controller 125 of the memory device 120), cause the memory device to perform the method 400.

As shown in FIG. 4, the method 400 may include accessing a first set of data stored in a first memory component (block 410). For example, a memory device may access host data stored in a first page, block, or a similar portion of a memory, as described above in connection with FIGS. 3A-3E. As further shown in FIG. 4, the method 400 may include updating a first access counter associated with the first memory component based on accessing the first set of data (block 420). For example, the memory device may update an access counter associated with the first page, block, or similar portion of the memory, as described above in connection with FIGS. 3A-3E. As further shown in FIG. 4, the method 400 may include determining whether the first access counter satisfies a first value of an access counter threshold (block 430). For example, the memory device may determine if the access counter associated with the first page, block, or similar portion of the memory satisfies an initially configured value of an access counter threshold, such as 8 in the examples described above in connection with FIGS. 3A-3E. As further shown in FIG. 4, the method 400 may include updating a value of the access counter threshold to a second value (block 440). For example, the memory device may update the value of the access counter using one of the policies described above in connection with FIGS. 3A-3E (e.g., by adding an integer to the initially configured access counter threshold; by setting the access counter threshold to a ceiling of an average of the initially configured access counter threshold and a value of an access counter associated with the first page, block, or similar portion of the memory; by setting the access counter threshold to a maximum of the initially configured access counter threshold and a value of an access counter associated with the first page, block, or similar portion of the memory; by setting the hotness counter threshold to a ceiling of an average of values of multiple hotness counters associated with multiple pages, blocks, or similar portions of the memory; among other examples).

As further shown in FIG. 4, the method 400 may include accessing a second set of data stored in a second memory component (block 450). For example, a memory device may access host data stored in a second page, block, or similar portion of a memory, as described above in connection with FIGS. 3A-3E. As further shown in FIG. 4, the method 400 may include updating a second access counter associated with the second memory component based on accessing the second set of data (block 460). For example, the memory device may update an access counter associated with the second page, block, or similar portion of the memory, as described above in connection with FIGS. 3A-3E. As further shown in FIG. 4, the method 400 may include determining whether the second access counter satisfies the second value of the access counter threshold (block 470). For example, the memory device may determine if the access counter associated with the second page, block, or similar portion of the memory satisfies an updated access counter threshold, as described above in connection with FIGS. 3A-3E.

The method 400 may include additional aspects, such as any single aspect or any combination of aspects described below and/or described in connection with one or more other methods or operations described elsewhere herein.

In a first aspect, the method 400 includes determining, by the memory device, that at least one of the first access counter satisfies the first value or the second access counter satisfies the second value, and adding, by the memory device, at least one of a first identifier of the first memory component or a second identifier of the second memory component to a first-in-first-out data structure based on determining that the at least one of the first access counter satisfies the first value or the second access counter satisfies the second value. For example, the memory device may add the first and/or second page, block, or similar portion of the memory to a FIFO hotness tracking list (e.g., HN-L) when the first and/or second access counter satisfies the initially configured access counter threshold or the updated access counter threshold, respectively.

In a second aspect, alone or in combination with the first aspect, the method 400 includes determining, by the memory device, that at least one of the first access counter does not satisfy the first value or the second access counter does not satisfy the second value, and refraining from adding, by the memory device, at least one of a first identifier of the first memory component or a second identifier of the second memory component to a first-in-first-out data structure based on determining that the at least one of the first access counter does not satisfy the first value or the second access counter does not satisfy the second value. For example, the memory device may refrain from adding the first and/or second page, block, or similar portion of the memory to a FIFO hotness tracking list (e.g., HN-L) when the first and/or second access counter fails to satisfy the initially configured access counter threshold or the updated access counter threshold, respectively.

In a third aspect, alone or in combination with one or more of the first and second aspects, the method 400 includes determining, by the memory device, that a time period has elapsed, and setting, by the memory device, the value of the access counter threshold to a third value based on determining that the time period has elapsed, wherein the third value is one of a default value of the access counter threshold, a current value of the access counter threshold reduced according to a reduction factor, or the current value of the access counter threshold. For example, the memory device may reset the access counter to the initially configured access counter threshold or another value, based on user-configured parameters, among other examples.

In a fourth aspect, alone or in combination with one or more of the first through third aspects, the method 400 includes receiving, by the memory device, configuration information associated with the access counter threshold, wherein the configuration information indicates at least one of enablement of dynamic adjustment of the access counter threshold, a beginning value of the access counter threshold, an adjustment policy for the access counter threshold, a reset policy for the access counter threshold. For example, the memory device may receive configuration information setting certain parameters associated with an access counter, such as a parameter enabling a dynamic access counter threshold, a parameter indicating an initially configured access counter threshold, a parameter indicating a policy to be used to dynamically update the access counter threshold (e.g., one of the soft policy methodology described above in connection with FIG. 3A, the mid policy methodology described above in connection with FIG. 3B, the aggressive policy methodology described above in connection with FIG. 3C, the average policy methodology described above in connection with FIG. 3D, or the moving average policy methodology described above in connection with FIG. 3E), a parameter indicating how the access counter threshold is to be reduced and/or reset following a tracking epoch, and/or the like.

In a fifth aspect, alone or in combination with one or more of the first through fourth aspects, the method 400 includes determining, by the memory device, that the first access counter satisfies the first value, wherein determining the second value comprises adding an integer to the first value based on determining that the first access counter satisfies the first value. For example, the memory device may update the access counter threshold according to the soft policy methodology described above in connection with FIG. 3A, or a similar methodology.

In a sixth aspect, alone or in combination with one or more of the first through fifth aspects, the method 400 includes determining, by the memory device, that the first access counter satisfies the first value, wherein determining the second value comprises determining a ceiling of an average of the first value and a value of the first access counter. For example, the memory device may update the access counter threshold according to the mid policy methodology described above in connection with FIG. 3B, or a similar methodology.

In a seventh aspect, alone or in combination with one or more of the first through sixth aspects, the method 400 includes determining, by the memory device, that the first access counter satisfies the first value, wherein determining the second value comprises determining a maximum of the first value and a value of the first access counter. For example, the memory device may update the access counter threshold according to the aggressive policy methodology described above in connection with FIG. 3C, or a similar methodology.

In an eighth aspect, alone or in combination with one or more of the first through seventh aspects, determining the second value comprises determining a ceiling of an average of the first value and a value of the first access counter. For example, the memory device may update the access counter threshold according to the average policy methodology described above in connection with FIG. 3D, or a similar methodology.

In a ninth aspect, alone or in combination with one or more of the first through eighth aspects, determining the second value comprises determining a ceiling of an average of values of multiple access counters associated with multiple memory components. For example, the memory device may update the access counter threshold according to the moving average policy methodology described above in connection with FIG. 3E, or a similar methodology.

In a tenth aspect, alone or in combination with one or more of the first through ninth aspects, the multiple access counters are associated with a moving average window. For example, the memory device may update the access counter threshold by setting the access counter threshold to a ceiling of an average of five previous access counter values, as described above in connection with FIG. 3E, among other examples.

Although FIG. 4 shows example blocks of a method 400, in some implementations, the method 400 may include additional blocks, fewer blocks, different blocks, or differently arranged blocks than those depicted in FIG. 4. Additionally, or alternatively, two or more of the blocks of the method 400 may be performed in parallel. The method 400 is an example of one method that may be performed by one or more devices described herein. These one or more devices may perform or may be configured to perform one or more other methods based on operations described herein.

In some implementations, a memory device includes one or more components configured to: access a first set of data stored in a first memory component; update a first access counter associated with the first memory component based on accessing the first set of data; determine whether the first access counter satisfies a first value of an access counter threshold; update a value of the access counter threshold to a second value; access a second set of data stored in a second memory component; update a second access counter associated with the second memory component based on accessing the second set of data; and determine whether the second access counter satisfies the second value of the access counter threshold.

In some implementations, a method includes accessing, by a memory device, a first set of data stored in a first memory component; updating, by the memory device, a first access counter associated with the first memory component based on accessing the first set of data; determining, by the memory device, whether the first access counter satisfies a first value of an access counter threshold; updating, by the memory device, a value of the access counter threshold to a second value; accessing, by the memory device, a second set of data stored in a second memory component; updating, by the memory device, a second access counter associated with the second memory component based on accessing the second set of data; and determining, by the memory device, whether the second access counter satisfies the second value of the access counter threshold.

In some implementations, a memory system includes one or more components configured to: receive, from a host system, a first request to access a first set of host data stored in a first portion of memory; access the first set of host data stored in the first portion of memory based on receiving the first request; update a first hotness counter associated with the first portion of memory component based on accessing the first set of host data; determine whether the first hotness counter satisfies a first value of a hotness counter threshold; update a value of the hotness counter threshold to a second value; receive, from the host system, a second request to access a second set of host data stored in a second portion of memory; access the second set of host data stored in the second portion of memory based on receiving the second request; update a second hotness counter associated with the second portion of memory based on accessing the second set of host data; and determine whether the second hotness counter satisfies the second value of the hotness counter threshold.

The foregoing disclosure provides illustration and description but is not intended to be exhaustive or to limit the implementations to the precise forms disclosed. Modifications and variations may be made in light of the above disclosure or may be acquired from practice of the implementations described herein.

As used herein, the terms "substantially" and "approximately" mean "within reasonable tolerances of manufacturing and measurement." As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of implementations described herein. Many of these features may be combined in ways not specifically recited in the claims and/or disclosed in the specification. For example, the disclosure includes each dependent claim in a claim set in combination with every other individual claim in that claim set and every combination of multiple claims in that claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

When "a component" or "one or more components" (or another element, such as "a controller" or "one or more controllers") is described or claimed (within a single claim or across multiple claims) as performing multiple operations or being configured to perform multiple operations, this language is intended to broadly cover a variety of architectures and environments. For example, unless explicitly claimed otherwise (e.g., via the use of "first component" and "second component" or other language that differentiates components in the claims), this language is intended to cover a single component performing or being configured to perform all of the operations, a group of components collectively performing or being configured to perform all of the operations, a first component performing or being configured to perform a first operation and a second component performing or being configured to perform a second operation, or any combination of components performing or being configured to perform the operations. For example, when a claim has the form "one or more components configured to: perform X; perform Y; and perform Z," that claim should be interpreted to mean "one or more components configured to perform X; one or more (possibly different) components configured to perform Y; and one or more (also possibly different) components configured to perform Z."

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Where only one item is intended, the phrase "only one," "single," or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. As used herein, the term "multiple" can be replaced with "a plurality of" and vice versa. Also, as used herein, the term "or" is intended to be inclusive when used in a series and may be used interchangeably with "and/or," unless explicitly stated otherwise (e.g., if used in combination with "either" or "only one of").

What is claimed is:

1. A memory device, comprising:

one or more components configured to:

- access a first set of data stored in a first memory component;
- update a first access counter associated with the first memory component based on accessing the first set of data;
- determine whether the first access counter satisfies a first value of an access counter threshold;
- update, based on determining that the first access counter satisfies the first value. a value of the access counter threshold to a second value;
- determine the second value by being configured to determine:
  - a ceiling of an average of the first value and a value of the first access counter, a maximum of the first value and the value of the first access counter, or a ceiling of an average of values of multiple access counters associated with multiple memory components;

access a second set of data stored in a second memory component;

update a second access counter associated with the second memory component based on accessing the second set of data; and determine whether the second access counter satisfies the second value of the access counter threshold.

2. The memory device of claim 1, wherein the one or more components are further configured to:

determine that at least one of the first access counter satisfies the first value or the second access counter satisfies the second value; and add at least one of a first identifier of the first memory component or a second identifier of the second memory component to a first-in-first-out data structure based on determining that the at least one of the first access counter satisfies the first value or the second access counter satisfies the second value.

3. The memory device of claim 1, wherein the one or more components are further configured to:

determine that at least one of the first access counter does not satisfy the first value or the second access counter does not satisfy the second value; and refrain from adding at least one of a first identifier of the first memory component or a second identifier of the second memory component to a first-in-first-out data structure based on determining that the at least one of the first access counter does not satisfy the first value or the second access counter does not satisfy the second value.

4. The memory device of claim 1, wherein the one or more components are further configured to:

determine that a time period has elapsed; and set the value of the access counter threshold to a third value based on determining that the time period has elapsed, wherein the third value is a default value of the access counter threshold.

5. The memory device of claim 1, wherein the one or more components are further configured to receive configuration information associated with the access counter threshold, and wherein the configuration information indicates at least one of:

enablement of dynamic adjustment of the access counter threshold, a beginning value of the access counter threshold, an adjustment policy for the access counter threshold, or a reset policy for the access counter threshold.

6. The memory device of claim 1, wherein the multiple access counters are associated with a moving average window.

7. The memory device of claim 1, wherein the one or more components are further configured to:

determine that a time period has elapsed; and set the value of the access counter threshold to a third value based on determining that the time period has elapsed, wherein the third value is a current value of the access counter threshold reduced according to a reduction factor.

8. The memory device of claim 1, wherein the one or more components are further configured to:

determine that a time period has elapsed; and set the value of the access counter threshold to a third value based on determining that the time period has elapsed, wherein the third value is a current value of the access counter threshold.

9. A method, comprising:

accessing, by a memory device, a first set of data stored in a first memory component;

updating, by the memory device, a first access counter associated with the first memory component based on accessing the first set of data;

determining, by the memory device, whether the first access counter satisfies a first value of an access counter threshold;

updating, by the memory device, based on determining that the first access counter satisfies the first value, a value of the access counter threshold to a second value;

determining the second value by determining:

a ceiling of an average of the first value and a value of the first access counter, a maximum of the first value and the value of the first access counter, or a ceiling of an average of values of multiple access counters associated with multiple memory components;

accessing, by the memory device, a second set of data stored in a second memory component;

updating, by the memory device, a second access counter associated with the second memory component based on accessing the second set of data; and determining, by the memory device, whether the second access counter satisfies the second value of the access counter threshold.

10. The method of claim 9, wherein the multiple access counters are associated with a moving average window.

11. The method of claim 9, further comprising:

receiving configuration information associated with the access counter threshold, wherein the configuration information indicates enablement of dynamic adjustment of the access counter threshold.

12. The method of claim 9, further comprising:

receiving configuration information associated with the access counter threshold, wherein the configuration information indicates a beginning value of the access counter threshold.

13. The method of claim 9, further comprising:

receiving configuration information associated with the access counter threshold, wherein the configuration information indicates an adjustment policy for the access counter threshold.

14. The method of claim 9, further comprising:

receiving configuration information associated with the access counter threshold, wherein the configuration information indicates a reset policy for the access counter threshold.

15. A memory system, comprising:

one or more components configured to:

receive, from a host system, a first request to access a first set of host data stored in a first portion of memory;

access the first set of host data stored in the first portion of memory based on receiving the first request;

update a first hotness counter associated with the first portion of memory based on accessing the first set of host data;

determine whether the first hotness counter satisfies a first value of a hotness counter threshold;

update a value of the hotness counter threshold to a second value;

determine the second value by being configured to determine:

a ceiling of an average of the first value and a value of the hotness counter threshold, a maximum of the first value and the value of the hotness counter threshold, or a ceiling of an average of values of multiple hotness counters associated with multiple memory components;

receive, from the host system, a second request to access a second set of host data stored in a second portion of memory;

access the second set of host data stored in the second portion of memory based on receiving the second request;

update a second hotness counter associated with the second portion of memory based on accessing the second set of host data; and determine whether the second hotness counter satisfies the second value of the hotness counter threshold.

16. The memory system of claim 15, wherein the one or more components are further configured to:

determine that at least one of the first hotness counter satisfies the first value or the second hotness counter satisfies the second value; and add at least one of a first identifier of the first portion of memory or a second identifier of the second portion of memory component to a first-in-first-out hotness list based on determining that the at least one of the first hotness counter satisfies the first value or the second hotness counter satisfies the second value.

17. The memory system of claim 15, wherein the one or more components are further configured to:

determine that an epoch has elapsed; and set the value of the hotness counter threshold to a third value based on determining that the epoch has elapsed, wherein the third value is a default value of the hotness counter threshold.

18. The memory system of claim 15, wherein the one or more components are further configured to:

determine that an epoch has elapsed; and set the value of the hotness counter threshold to a third value based on determining that the epoch has elapsed, wherein the third value is a default value of the hotness counter threshold.

19. The memory system of claim 15, wherein the one or more components are further configured to:

determine that an epoch has elapsed; and set the value of the hotness counter threshold to a third value based on determining that the epoch has elapsed, wherein the third value is a current value of the hotness counter threshold.

20. The memory system of claim 15, wherein the multiple hotness counters are associated with a moving average window.

* * * * *